United States Patent [19]
Harris

[11] 3,795,819
[45] Mar. 5, 1974

[54] OPTICAL RADIATION FREQUENCY CONVERTER AND METHOD

[76] Inventor: Stephen E. Harris, 880 Richardson Ct., 03, Palo Alto, Calif. 94306

[22] Filed: Nov. 11, 1971

[21] Appl. No.: 197,889

[52] U.S. Cl. .............................. 307/88.3, 321/69 R
[51] Int. Cl. ............................................. H02m 5/04
[58] Field of Search...................... 307/88.3; 321/69

[56] References Cited
UNITED STATES PATENTS
2,929,922   3/1960   Schawlow et al. .................. 331/94.5
3,371,265   2/1968   Woodbury et al. ................. 307/88.3
3,422,344   1/1969   Malnar................................... 331/94
3,720,882   3/1973   Tang et al. ......................... 307/88.3

*Primary Examiner*—Herman Karl Saalbach
*Assistant Examiner*—Darwin R. Hostetter
*Attorney, Agent, or Firm*—Flehr, Hohback, Test, Abritton & Herbert

[57] ABSTRACT

An optical radiation frequency converter including a cell containing a metal vapor or a mixture of a metal vapor and a second metal vapor or gas and a source of monochromatic radiation of one frequency to be converted to another frequency positioned to project the monochromatic radiation through the cell whereby the metal vapor converts the radiation from the one frequency to the other frequency.

17 Claims, 6 Drawing Figures

STEPHEN E. HARRIS
INVENTOR.

BY Flehr, Hohbach, Test,
Albritton and Herbert
ATTORNEYS

STEPHEN E. HARRIS
INVENTOR.

BY Flehr, Hohbach, Test,
Albritton and Herbert
ATTORNEYS

OPTICAL RADIATION FREQUENCY CONVERTER AND METHOD

GOVERNMENT CONTRACT

The invention described herein was made in the performance of work under a NASA contract and is subject to the provisions of Section 3 of the National Aeronautics & Space Act of 1958, Public Law 85-568 (72 Stat. 435; 42 U.S.C. 2457).

BACKGROUND OF THE INVENTION

This invention relates generally to an optical radiation frequency converter employing metal vapors.

It is known to employ non-linear optics to generate harmonic frequencies of input radiation. That is, it is known to employ gases, liquids and solids to which incident radiation of one wavelength is applied and output radiation at a harmonic wavelength is obtained. Phase matching at the two frequencies is known. Armstrong et al. "Interaction Between Light Waves in Non-Linear Dielectric", Physical Review 127, 1918 (1962) suggests phase matching by the admixture of molecular species.

However, most liquids and solids are opaque in the ultra-violet region of the spectrum at wavelengths shorter than about 2500 Angstroms and thus are not useful in this region. Gas harmonic generators of the prior art have not been useful because of their low efficiency.

OBJECTS AND SUMMARY OF THE INVENTION

It is a general object of the present invention to provide a radiation frequency converter useful in the ultra-violet region of the spectrum.

It is another object of the present invention to provide a radiation frequency converter employing metal vapors.

It is a further object of the present invention to provide an efficient radiation frequency converter employing a mixture of a metal vapor and another metal vapor or a gas.

The foregoing and other objects of the invention are achieved by a radiation converter comprising a cell, means for maintaining metal vapor atoms in said cell and means for projecting monochromatic radiation into said cell whereby to convert the frequency of the radiation to provide an output radiation at another frequency.

DESCRIPTION OF PREFERRED EMBODIMENTS

Figure 1:
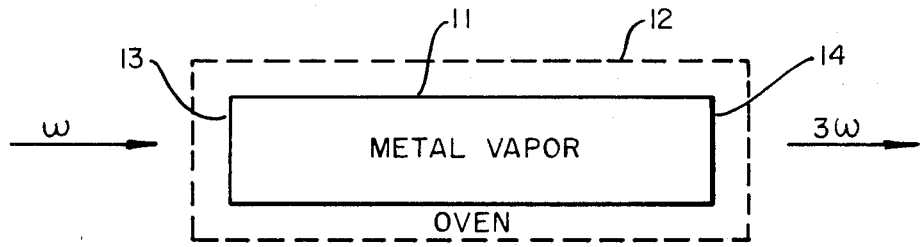
FIG. 1 is a side elevational view of one embodiment of a radiation converter in accordance with the invention.

One embodiment of the radiation converter is illustrated in FIG. 1. The converter comprises a gas or vapor cell 11 which is filled with at least one metal vapor and maintained at a temperature which assures that sufficient metal atoms are present in the cell to convert the incident radiation indicated as $\omega$ into third harmonic radiation indicated as $3\omega$. The cell temperature is maintained by placing it in an oven 12. The cell 11 may include an opaque elongated body portion with windows 13 and 14 disposed at each end. The cell may include any other suitable envelope for containing the metal vapor and which can be maintained at an elevated temperature.

The metal vapor to accomplish the third harmonic process is one which has its fundamental dominant atomic frequency resonance or group of strong atomic resonance frequencies in the spectral region between the fundamental frequency $\omega$ which is to be converted and the third harmonic $3\omega$ which is to be generated.

The alkali metal vapors comprising Lithium (Li), Sodium (Na), Potassium (K), Rubidium (Rb), and Cesium (Cs) have their atomic transition frequencies in the visible or near infra-red and thus they are suitable for converting the output wavelength or frequency of many conventional lasers to a higher frequency in the ultra-violet region of the spectrum.

A simplified description of the converting process follows. The incident wave at the fundamental frequency $\omega$ is applied at a sufficient power level that its power density corresponds to rather large electric field strengths (typically $10^5$ volts/cm). This strong electric field interacts with the metallic vapor atoms to generate an electric dipole polarizability. This is the normal (linear) polarization and is enhanced if the fundamental frequency is near any atomic resonance frequency (transition to ground). The generated polarizability referred to above mixes with the incident electric field to generate fluctuations in the atomic population at a frequency twice that of the incident fundamental radiation. The term "fluctuations" in the atomic population must be taken in the general sense to include off-diagonal or mixed-state fluctuations of the density matrix.

It is noted that although the atomic system exhibits fluctuations at a frequency $2\omega$, no radiation at such frequency is possible. For radiation, we must proceed through another non-linear stage of the "internal" atomic interaction. Here, the fluctuations of the atomic population mentioned in the preceding paragraph again mix with the incident electro-magnetic field to generate a dipole polarization at three times the incident or fundamental frequency. This dipole moment then radiates at the third harmonic frequency.

For a concise review, the non-linear atomic process is: electric field at frequency $\omega$ generates dipole polarization at frequency $\omega$; dipole polarization at $\omega$ mixes with the electric field at $\omega$ to generate atomic fluctuations at frequency $2\omega$; atomic fluctuations at $2\omega$ mix with the incident electro-magnetic field to generate dipole polarization at frequency $3\omega$. The dipole polarization at $3\omega$ radiates the third harmonic frequency.

The formula for the third order non-linear polarization (the polarization or non-linearity is called third order because three frequencies are required to produce a fourth frequency) are well known in the literature. In general terms, the non-linearity will be strong if there exists strong atomic transitions between a number of different atomic states which have resonant frequencies close to either the fundamental frequency, twice the fundamental frequency, or three times the fundamental frequency. This is the case as mentioned above for alkali metal vapors for generation of third harmonic frequencies in the near or middle ultra-violet region of the spectrum. As one goes further into the ultra-violet region, a different metal vapor may be necessary. Mercury vapor should be an appropriate vapor for generation from 3547 Angstroms to 1182 Angstroms. In summary, the key to choosing a vapor with a strong non-linearity is that it must have resonant frequencies relatively close to either $\omega$, $2\omega$ or $3\omega$ where $\omega$ is the frequency of the incident laser beam to be converted to the third harmonic frequency.

The third order non-linear process in metal vapors can also be employed to convert three input frequencies $\omega_1$, $\omega_2$ and $\omega_3$, generating a fourth frequency $\omega_4$. The radiating polarizations will be generated by the non-linear atomic process and the output will be at frequencies $\pm\omega_1 \pm\omega_2 \pm\omega_3$ where the combination frequency is a positive number. Note that as the special case of this process, we have the process where three frequencies are equal and one obtains $3\omega_1$.

Figure 2:
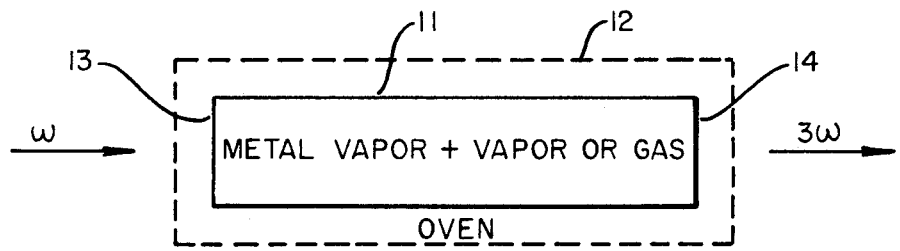
FIG. 2 is a side elevational view of another embodiment of a radiation converter in accordance with the invention.

Referring to FIG. 2, the preferred embodiment of the invention is illustrated. Like reference numerals are applied to like parts. The metal vapor is mixed in predetermined proportion with another metal vapor or gas. The amount of additional vapor or gas is in a ratio which makes the refractive index at the third harmonic frequency substantially equal to that at the fundamental frequency, whereby the velocity of the waves in the mixture at the two frequencies are substantially equal.

Phase matching in the present invention is accomplished by blending the negatively dispersive metal vapor with a normally dispersive gas to obtain equal velocities at the fundamental and third harmonic frequencies.

As previously described, the metal vapor is selected to have atomic resonant frequencies near the fundamental frequency to be converted. One further consideration in the selection of the vapor is that the metal vapor must also have a suitable refractive index whereby it can be phase matched with the second vapor or gas to achieve phase matching. Considering, for example, the alkali metal rubidium and referring to FIG. 4, there is shown a crude plot of the variation of the refractive index of rubidium as a function of wavelength. It is observed that the dominant resonance is in the vicinity of 7800 Angstroms. As is well known, the refractive index rises as this resonance is approached from longer wavelengths and comes in from the negative side at frequencies slightly above this resonance wavelength. The refractive index then continues to rise towards the ultra-violet and remains less than one unless some additional atomic resonance is encountered.

By contrast now, consider the refractive index of a normally dispersive gas such as xenon (Xe). The atomic resonance for xenon lies in the ultra-violet and thus through the visible spectrum the index is slowly rising as indicated by the dotted curve of FIG. 4. From FIG. 4, it is noted that the refractive index for rubidium at 3547 Angstroms is less than the refractive index at 1064 Angstroms. On the other hand, for xenon, the refractive index at the shorter wavelength is greater than the refractive index at its longer wavelength. Thus, by inspection of this figure, it is clear that there must exist some ratio of xenon to rubidium such that the refractive index at 3547 Angstroms will equal the refractive index at 1064 Angstroms. This necessary ratio is what is known as phase matching.

Thus, if a person chooses an appropriate metal vapor to accomplish a particular harmonic process, he proceeds by choosing a metal vapor having its fundamental dominant atomic resonance in the vicinity between the fundamental frequency to be converted and the third harmonic to be generated. There is no such requirement on the buffer gas to be used. It need only be normally dispersive and will in almost all cases have resonance frequencies above, that is, at shorter wavelengths than the third harmonic frequency which is to be generated. After making an intuitive choice of the proper metal vapor, one may calculate the exact necessary ratio by means of appropriate Sellmeier formula or equations. These equations are well known in the literature but they must be constructed for any particular case of interest. This, in general, involves knowing the oscillator strengths of all the pertinent relatively strong transitions from the ground state. For the alkali metal vapors and other metal vapors, this data is generally available. For other metals, this data may not be available. However, the appropriate metal vapor may be selected experimentally.

Figure 4:
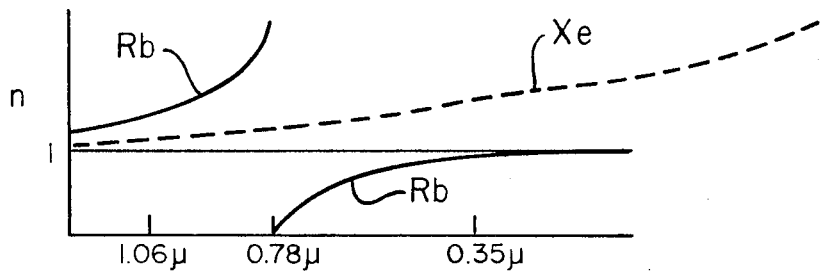
FIG. 4 shows the refractive index ($n$) of xenon and rubidium as a function of wavelength.

Assuming that the data is available, one can construct the Sellmeier equation which gives the refractive index versus wavelength as shown in FIG. 4. This is done for each metal vapor and an appropriate equality is then constructed which is used to solve for the necessary ratio of atoms of one species to those of the other species.

For the case of three input frequencies, a more general type of phase matching condition is necessary. Refractive indices of the three frequencies must be so related that the polarization wave which drives the generated electro-magnetic wave travels at substantially the same velocity as the free electro-magnetic wave at the generated frequency. This condition is commonly denoted by the notation $\bar{k}_1+\bar{k}_2+\bar{k}_3=\bar{k}_4$ where the subscript four denotes the frequency of the generated wave.

Calculations have been carried out for the metal vapors of rubidium and sodium with a xenon buffer gas. The results of such calculations are shown in the following table where three possible tripling experiments are set forth:

TABLE I

| | | | | |
|---|---|---|---|---|
| 1 | $\lambda_F \rightarrow \lambda_{3rd}$ | 10640 A.→3547 A. | 6943 A.→2314 A. | 6000 A.→2000 A. |
| 2 | Metal vapor | Rb | Na | Na |
| 3 | Buffer gas | Xe | Xe | Xe |
| 4 | Metal atoms/cc.+ | 2.25×10$^{17}$ | 7.73×10$^{16}$ | 2.12×10$^{16}$ |
| 5 | Partial pressure of metal vapor (mm. Hg.) | 16.0 | 6.40 | 1.61 |
| 6 | Cell temperature, °C | 415 | 527 | 461 |
| 7 | xMetal vapor (esu) | 7.42×10$^{-32}$ | 5.86×10$^{-33}$ | 16.36×10$^{-33}$ |
| 8 | L$_c$ (cm.) | 9.62×10$^{-2}$ | 2.60×10$^{-1}$ | 1.10×10$^{-1}$ |
| 9 | Number atoms buffer gas/number atoms metal vapor | 412/1 | 100/1 | 476/1 |
| 10 | P$_F$/A (50% conversion L=50 cm.) (watts/cm.$^3$) | 7.27×10$^5$ | 1.75×10$^{10}$ | 5.07×10$^{10}$ |
| 11 | P$_F$ (50% conversion) (watts) | 1.93×10$^6$ | 3.04×10$^7$ | 7.61×10$^7$ |

In each case the number of metal atoms per cubic cm are chosen to yield a maximum transmission loss at fundamental or third harmonic of 25 percent in a 50 cm long cell in the presence of a higher pressure buffer gas used for phase matching. Calculations of third harmonic linearity were carried out using the formulas of Armstrong et al "Interaction Between Light Waves in Non-linear Dielectric", Physical Review 127, 1918 (1962), and the results are given on line 7 of the Table in each instance.

The refractive indices of the metal vapors were calculated from the standard Sellmeier formula, the coherence length for third harmonic generation for the non-phase match metal vapor is given on line 8 and corresponds to the metal vapor pressure given on line 5.

To obtain phase matching and thus to increase the conversion efficiency by $(L/L_c)^2$, a normally dispersive buffer gas at a partial pressure to cause the refractive indices or thp velocity at the fundamental and third harmonic frequencies to be equal is used. Refractive indices for xenon were obtained from the formula of Koch "On the Refraction and Dispersion of the Noble Gases Krypton and Xenon," Kungl. Fysiografiska Sällskapets I Lund Fördhandlingar 19, 173 (1949). Line 9 of the Table gives the ratio of the number of atoms of xenon to the number of atoms of metal vapor which is necessary for phase matching.

Lines 10 and 11 of Table I give the necessary fundamental power density and fundamental power (assuming confocal focusing) which are necessary to obtain 50 percent conversion efficiency to a third harmonic. These values are based on a cell length of 50 cm and the number of metal vapor atoms given in line 4.

Experiments were carried out to confirm the above with converters of the type shown in FIGS. 1 and 2. The experimental apparatus consisted of an acousto-optically Q-switched Nd:YAG laser and amplifier which furnished up to 100 killowatts of $TEM_{oo}$ mode radiation at 1064 Angstroms. The rubidium cell was 19 cm long and was constructed of pyrex. Rubidium vapor was placed in a side arm which was maintained at a somewhat lower temperature than the temperature of the main cell. By controlling the side arm temperature from about 100°C to 320°C, the vapor pressure could be continuously varied between $2\times10^{-4}$ Torr and 2 Torr. In the second experiment, different pressures of xenon were placed in the cell before sealing. The 3547 Angstrom light was detected using an RCA IP28 photomultiplier with an S5 photocathode which followed filters and a monochrometer used to discriminate against the 1064 Angstrom radiation.

Figure 5:
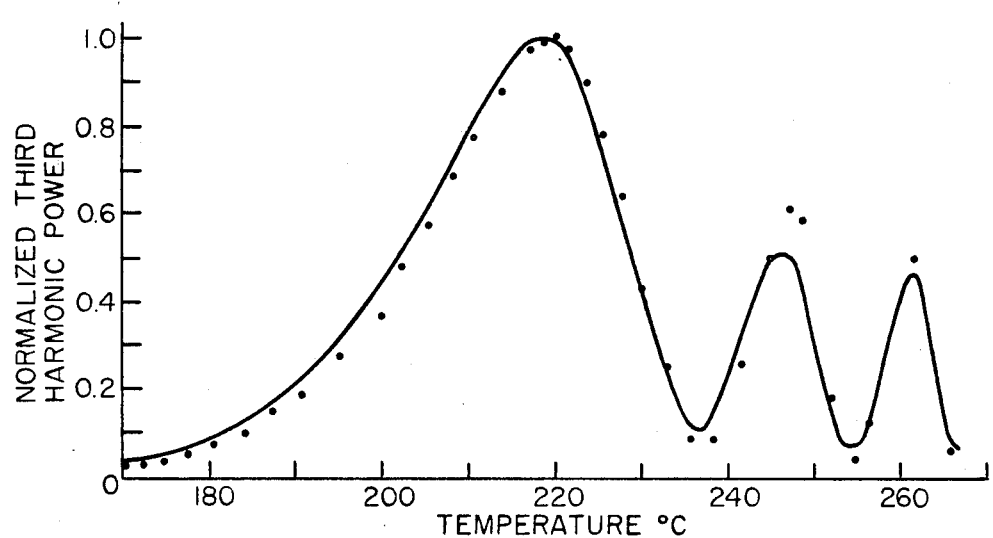
FIG. 5 shows normalized third harmonic power as a function of temperature for rubidium vapor.

The first experiment was performed without any xenon present and it was aimed at determining the non-linearity of the rubidium vapor. The incident laser beam was focused to a beam diameter 0.52 mm positioned at the output window of the rubidium cell. The confocal parameters for this focus was 40 cm, thus yielding a slightly converging beam over the length of the cell. FIG. 5 shows generated third harmonic power as a function of temperature of the rubidium vapor. The solid curve was derived theoretically. The data was normalized whereby to give a comparison.

Figure 6:
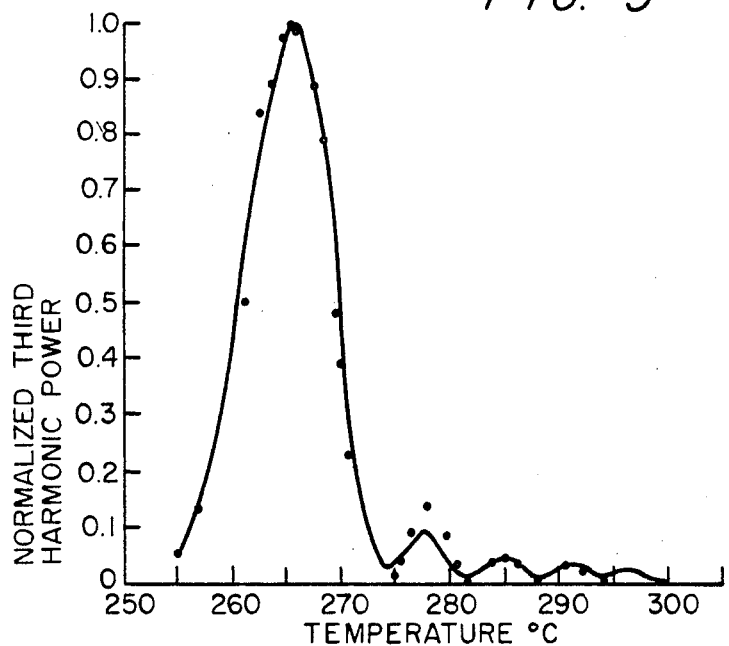
FIG. 6 shows normalized third harmonic power as a function of temperature for rubidium vapor with 81 Torr xenon at temperature of 20°C.

FIG. 6 shows experimental results demonstrating that the rubidium vapor can be phase matched by introducing a normally dispersive gas such as xenon, thus allowing the interaction to extend over several coherence lengths. In this experiment, 81 Torr of xenon at 20°C was introduced into the cell before sealing. From the Sellmeier equation, phase matching was calculated to occur at a rubidium vapor pressure corresponding to a cell temperature T=262°. Experimental results are shown in FIG. 6. It is seen that for the same input power and focus, that the peak power obtained in the phase matched case exceeded that for the pure rubidium case by about a factor of 33.

Thus, the two experiments confirm third harmonic generation using metal vapors, and show that this third harmonic generation can be substantially enhanced or made more efficient by introducing a normally dispersive second gas in the cell to achieve phase matching.

Figure 3:
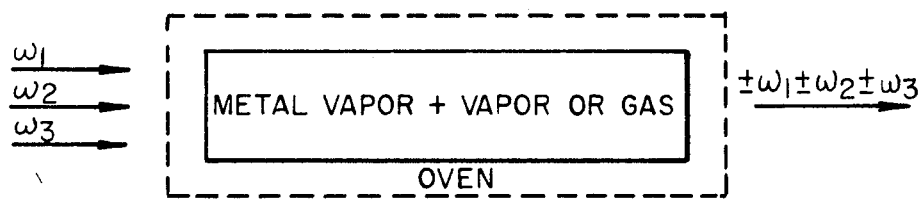
FIG. 3 is a side elevational view of still another embodiment of a radiation converter in accordance with the invention.

Referring to FIG. 3 of the drawings, there is shown the case wherein three input frequencies $\omega_1$, $\omega_2$ and $\omega_3$ impinge upon the cell and the output is indicated as previously described.

Thus, there has been provided an apparatus and method for converting radiation at one frequency to radiation at another frequency.

I claim:

1. An optical radiation converter for receiving incident radiation of one frequency and providing output radiation of a harmonic frequency comprising a vapor cell including spaced windows which are transparent to said incident and output radiation positioned to receive said incident radiation of one frequency at one window and radiate at said another frequency from the other window, a metal vapor providing metal atoms having fundamental dominant atomic resonance frequency or group of strong atomic resonance frequencies in the spectral region between said one frequency and said harmonic frequency disposed in said cell, means for maintaining a predetermined concentration of said metal vapor in said cell between said windows and a source of monochromatic energy to be converted, positioned to project radiation through said first window into said cell toward said second window to interact with the metal atoms between said windows and radiate at said harmonic frequency through said second window.

2. A radiation converter as in claim 1 wherein said metal vapor is the vapor of an alkali metal.

3. A radiation converter for receiving incident radiation of one frequency and radiating at a higher frequency comprising a vapor cell including spaced windows which are transparent to said incident and output radiation positioned to receive said incident radiation of one freuqency at one window and radiate at said higher frequency from the other window, a metal vapor providing metal atoms having fundamental dominant atomic resonance frequency or group of strong atomic resonance frequencies in the spectral region between said one frequency and said higher frequency disposed in said cell, means for maintaining a predetermined concentration of said metal vapor in said cell, a normally dispersive gas or vapor in said cell to form a predetermined mixture with the metal vapor, and a source of monochromatic energy of said one frequency to be converted to said higher frequency positioned to project radiation through said first window into said cell toward said second window with sufficient power to generate a strong dipole polarization in said metal atoms whereby they radiate from said second window at said higher frequency.

4. A radiation converter as in claim 3 wherein said metal vapor is the vapor of an alkali metal.

5. A radiation converter for receiving radiation of one frequency and radiating at a higher frequency comprising a vapor cell including spaced windows which are transparent to said incident and output radiation positioned to receive said incident radiation of one frequency at one window and generate output radiation at said higher frequency from the other window, a metal vapor providing metal atoms having fundamental dominant atomic resonance frequency or group of strong atomic resonance frequencies in the spectral region between said one frequency and said higher frequency disposed in said cell, a normally dispersive gas or vapor disposed in said cell to form a mixture with said metal vapor, the ratio of the refractive index of the metal vapor and the refractive index of the dispersive gas or vapor and the ratio of metal vapor atoms to normally dispersive gas or vapor atoms being selected such that the velocity of radiation through the mixture at the one frequency equals that at the higher frequency whereby the radiation at one frequency interacts with the atoms to generate a strong dipole polarization to generate radiation at said higher frequency.

6. The method of converting radiation at one frequency to radiation at a higher frequency which comprises the steps of selecting a metal vapor which has atomic resonance frequencies in the spectral region between said two frequencies and a predetermined index of refraction, mixing said vapor with a gas or vapor having normally dispersive characteristics and predetermined index of refraction to form a mixture, selecting the ratio of said metal vapor and normally dispersive vapor or gas such that the velocity of radiation through the medium at the one frequency equals that at the higher frequency, and projecting the radiation at said one frequency through said mixture whereby it interacts with the mixture to generate strong dipole polarization to generate radiation at said higher frequency.

7. The method as in claim 6 where the metal vapor is selected from the alkali metals.

8. The method as in claim 7 wherein the gas or vapor is an inert gas.

9. The method as in claim 7 where the inert gas is xenon.

10. A non-linear radiation converter for receiving radiation of one frequency and generating output radiation at the third harmonic of said frequency comprising a vapor cell positioned to receive said radiation of one frequency and generate output radiation at said third harmonic frequency, a metal vapor providing metal atoms having fundamental dominant atomic resonance frequency or group of strong atomic resonance frequencies in the spectral region between said one frequency and said third harmonic frequency disposed in said cell, means for maintaining a predetermined concentration of said metal vapor in said cell and a source of monochromatic energy of said one frequency to be converted to the third harmonic frequency positioned to project radiation into said cell with sufficient power to generate a strong dipole polarization in said metal atoms whereby they radiate at said third harmonic frequency.

11. A radiation converter for receiving radiation of one frequency and generating output radiation at the third harmonic of said frequency comprising a vapor cell positioned to receive said radiation of one frequency and generate output radiation at said third harmonic frequency, a metal vapor providing metal atoms having a fundamental dominant atomic resonance frequency or group of strong atomic resonance frequencies in the spectral region between said one frequency and said third harmonic frequency disposed in said cell, means for maintaining a predetermined concentration of metal vapor in said cell, a normally dispersive gas or vapor in said cell to form a mixture with the metal vapor, and a source of monochromatic energy to be converted to the third harmonic frequency positioned to project radiation into said cell with sufficient power to generate dipole polarization in said metal atoms whereby the atoms radiate at said third harmonic frequency.

12. An optical radiation converter as in claim 11 wherein said means for maintaining a predetermined concentration of metal vapor in said cell comprises means for maintaining said cell at an elevated temperature.

13. An optical radiation converter for converting optical radiation at one frequency to radiation at the third harmonic of said frequency comprising a vapor cell positioned to receive said radiation of one frequency and generate output radiation at said third harmonic frequency, a metal vapor providing metal atoms having fundamental dominant atomic resonance frequency or group of strong atomic resonance frequencies in the spectral region between said one frequency and said third harmonic frequency disposed in said cell, a normally dispersive gas or vapor disposed in said cell to form a mixture with said metal vapor, the ratio of the refractive index of the metal vapor and the refractive index of the dispersive gas or vapor and the ratio of metal vapor atoms to normally dispersive gas or vapor atoms being selected such that the velocity of radiation through the mixture at the fundamental frequency equals that at the third harmonic frequency whereby the radiation at said one frequency interacts with the atoms to generate radiation at said third harmonic frequency.

14. The method of converting radiation at one frequency to radiation at the third harmonic of said frequency which comprises the steps of selecting a metal vapor which has atomic resonance frequencies in the spectral region between said two frequencies and a predetermined index of refraction, mixing said vapor with a gas or vapor having normally dispersive characteristics and a predetermined index of refraction, selecting the ratio of said metal vapor and normally dispersive vapor or gas such that the velocity of radiation through the medium at one frequency equals that at the third harmonic frequency, and applying said radiation to said vapor and gas mixture whereby it interacts with the mixture to generate strong dipole polarization in said metal atoms whereby they radiate at said third harmonic frequency.

15. The method as in claim 14 where the metal vapor is selected from the alkali metals.

16. The method as in claim 15 wherein the gas or vapor is an inert gas.

17. An optical converter comprising a vapor cell, a metal vapor in said cell, means for maintaining a predetermined concentration of metal vapor in said cell and means for projecting monochromatic radiation at one or more frequencies $\omega_1$, $\omega_2$ and $\omega_3$ into said cell to obtain an output frequency $\pm\omega_1 \pm\omega_2 \pm\omega_3$.

* * * * *